United States Patent [19]

Kenrick et al.

[11] Patent Number: 5,304,273
[45] Date of Patent: Apr. 19, 1994

[54] METHOD FOR MANUFACTURE OF TWO-TONE VEHICLE TRIM PANEL

[75] Inventors: Paul Kenrick, Sterling Heights; Kuen C. Leung, Rochester Hills; Mark W. Fero, Mt. Clemens; Arthur C. Stein, Grosse Ile; Timothy W. Hill, Troy, all of Mich.

[73] Assignee: General Motors Corporation, Detroit, Mich.

[21] Appl. No.: 947,813

[22] Filed: Sep. 21, 1992

[51] Int. Cl.⁵ .............................................. B29C 39/12
[52] U.S. Cl. ..................... 156/219; 156/220; 156/242; 156/245; 156/250; 156/256; 156/258; 156/263; 156/266; 156/304.1; 156/304.3; 264/245; 264/247; 264/249; 264/257
[58] Field of Search ............... 156/219, 220, 242, 245, 156/250, 256, 258, 263, 266, 304.1, 304.3; 264/245, 247, 249, 257

[56] References Cited

U.S. PATENT DOCUMENTS

| | | | |
|---|---|---|---|
| 2,573,466 | 10/1951 | Lyijynen | 156/219 |
| 2,618,581 | 11/1952 | Lyijynen | 156/220 |
| 4,183,778 | 1/1980 | Mesnel | 156/304.3 |
| 4,323,406 | 4/1982 | Morello | 156/91 |
| 4,432,822 | 2/1984 | Adams et al. | 156/252 |
| 4,810,452 | 3/1989 | Taillefert et al. | 264/247 |
| 5,225,261 | 7/1993 | Kargarzadeh | 264/245 |

FOREIGN PATENT DOCUMENTS 1156588 4/1982 Italy..
1169194 4/1982 Italy .

Primary Examiner—Caleb Weston
Attorney, Agent, or Firm—Charles E. Leahy

[57] ABSTRACT

The present invention provides a new and improved method for manufacturing vehicle interior trim panels such as door panels and instrument panels in which different regions of the trim panel have different colors or other aesthetic characteristics. Two pieces of sheet vinyl having the desired color or other aesthetic characteristic desired in the manufactured trim panel are cut to shape and then bonded together edge-to-edge to form a composite two-tone vinyl sheet. This composite vinyl sheet is draped over a mold having a blade projecting from the mold surface. A retainer is installed onto the backside of the composite vinyl sheet to attach the composite vinyl sheet to the blade and thereby hold the vinyl in place with the bond between the two sheets located at the apex of the blade. The mold is closed and urethane is poured against the backside of the composite vinyl sheet to encapsulate the retainer. Upon cure, the urethane adheres to the composite vinyl sheet and the retainers and provides a substantial rigid support for the vinyl sheet. The bond between the two vinyl sheets is concealed from view at the bottom of the crevice defined in the molded trim panel by the blade.

2 Claims, 2 Drawing Sheets

METHOD FOR MANUFACTURE OF TWO-TONE VEHICLE TRIM PANEL

The invention relates to a method for manufacturing a motor vehicle trim panel having regions of different aesthetic characteristics.

BACKGROUND OF THE INVENTION

It is well known in motor vehicles to provide a trim panel for covering the vehicle interior structure such as the instrument panel or the door.

It is desirable to provide such a trim panel having regions of different aesthetic characteristics. For example, it may be desirable to provide a two-tone instrument panel cover or a two-tone door trim panel having regions of different color.

Vehicle trim panels are typically comprised of a cloth or vinyl covering over a rigid substrate. One method for manufacturing such trim panels is to load a sheet of vinyl in a mold and then pour urethane into the mold to adhere to the sheet vinyl. The cured urethane provides a rigid substrate panel to which the vinyl cover is adhered. Thus, by choosing the color of the vinyl sheet, the trim panel either matches or contrasts with the vehicle interior according to the choice of the vehicle interior designer.

The present invention provides a new and improved method for manufacturing vehicle interior trim panels such as door panels and instrument panels in which different regions of the trim panel have different colors or other aesthetic characteristics.

SUMMARY OF THE INVENTION

According to the invention, two pieces of sheet vinyl having the desired color or other aesthetic characteristic desired in the manufactured trim panel are cut to shape and then bonded together edge-to-edge to form a composite two-tone vinyl sheet. This composite vinyl sheet is draped over a mold having a blade projecting from the mold surface. A retainer is installed onto the backside of the composite vinyl sheet to attach the composite vinyl sheet to the blade and thereby hold the vinyl in place with the bond between the two sheets located at the apex of the blade. The mold is closed and urethane is poured against the backside of the composite vinyl sheet to encapsulate the retainer. Upon cure, the urethane adheres to the composite vinyl sheet and the retainers and provides a substantial rigid support for the vinyl sheet. The bond between the two vinyl sheets is concealed from view at the bottom of the crevice defined in the molded trim panel by the blade. A mat of reinforcing material such as glass fiber is laid over the composite vinyl sheet before the pouring of the urethane. The retainer is preferably a clip having spring loaded legs which clamp the vinyl sheet against opposing faces of the blade. The retainer may be a plurality of individual clips, or a continuous extruded member. The method of this invention is not limited to use in the manufacture of two-tone color articles, but rather may be employed whenever different aesthetic regions are desired in the trim panel. For example, the bonded together vinyl sheets may have different grain patterns, or different material compositions. one region may be relatively hard and another relatively soft, or one region may be vinyl and another region cloth.

BRIEF DESCRIPTION OF THE DRAWINGS

Accordingly, the object, feature, and advantage of the invention resides in the provision of a method for manufacturing vehicle trim panels having regions of different aesthetic characteristics.

The objects, features, and advantages of the invention will become apparent upon consideration of the description of the preferred embodiment and the appended drawings in which.

DESCRIPTION OF THE PREFERRED EMBODIMENT

Figure 1:
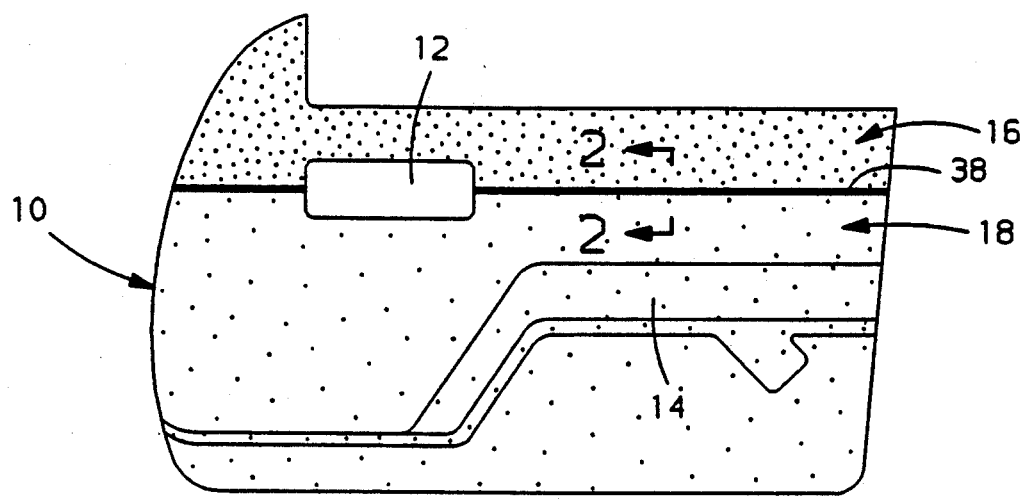
FIG. 1 is an elevation view of a vehicle door trim panel having regions of differing color.

Referring to FIG. 1, a vehicle door trim panel 10 is shown having a cut out 12 for accommodating the door handle assembly, not shown. The trim panel 10 also has an integral arm rest structure 14 molded therewith. The trim panel includes a generally planar upper region 16 located generally above the cutout 12 and a generally planar lower portion 18.

Figure 2:
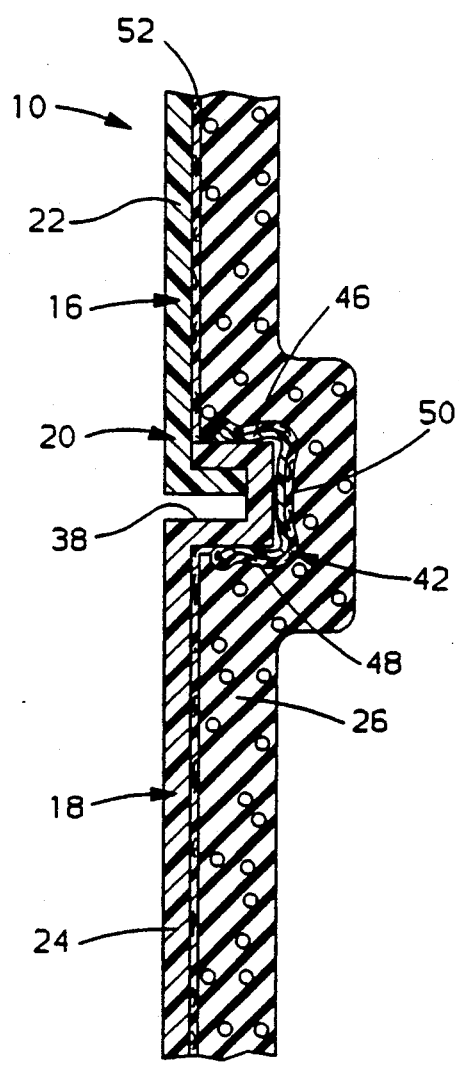
FIG. 2 is a fragmentary section view taken in the direction of arrows 2—2 of FIG. 1.

FIG. 2 is a section view taken through the door trim panel 10 and showing the interface between the upper region 16 and the lower region 18. As seen in FIG. 2, the door trim panel 10 is comprised of vinyl sheet material 20 which is adhered to and supported by a urethane molded substrate layer 26. The vinyl sheet 20 is a composite comprised of a first sheet of vinyl 22 and a second sheet of vinyl 24 having different aesthetic characteristics. In the preferred embodiment, these sheets are of different color, for example, the upper sheet 22 may be a dark brown and the lower sheet 24 a light brown, so that the door trim panel 10 of FIG. 1 includes an upper region 16 which is dark brown and a lower region 18 which is light brown.

The vinyl sheets 22 and 24 are suitably bonded together, edge-to-edge, using convention joining technology such as dielectric bonding, sewing, or adhesive. The joint may be a butt joint or a lap joint. The bonded together sheets 22 and 24 are loaded into a mold 28 shown in FIG. 3.

Figure 3:
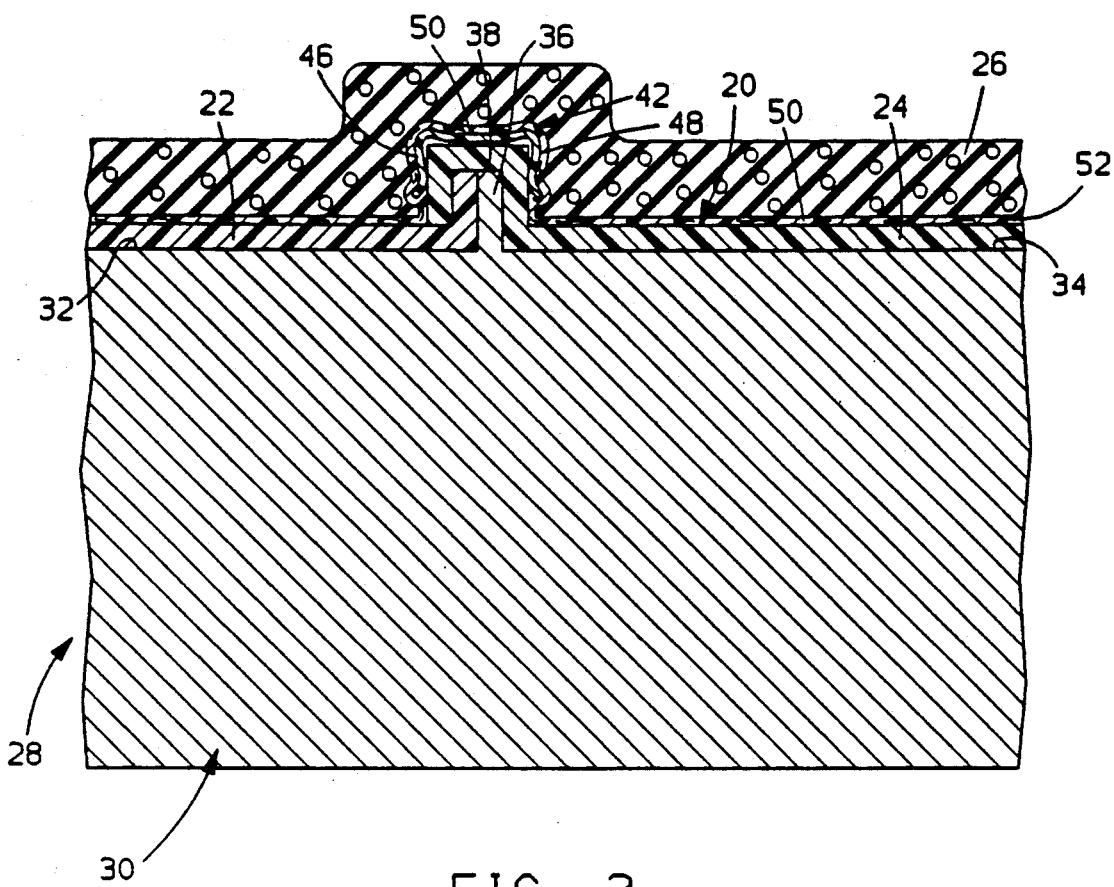
FIG. 3 is a section view taken through the mold in which the trim article is manufactured.

In FIG. 3, the mold 28 includes a lower mold 30 having a mold face 32 which supports the sheet 22 and a mold face 34 which supports the composite vinyl sheet 24. The boundary between the mold faces 32 and 34 is defined by a blade 36 which projects normally from the lower mold 30 by a height which will define a crevice 38 in the molded trim panel 10.

As seen in FIG. 3, the composite vinyl sheet 20 is draped over the lower mold 30 with the bond between the two sheets 22 and 24 overlying the blade 36. The composite vinyl sheet 20 is retained in place on the lower mold 30 by installing one or more clips 42. As seen in FIG. 3, the typical clip 42 is U-shaped and includes a pair of legs 46 and 48 which straddle the blade 36 and are connected by a web 50. The clip 42 may be of spring steel, excluded plastic, or other suitable construction and is chiefly characterized by the legs 46 and 48 being spring loaded toward one another so that the composite vinyl sheet 20 is spring clamped onto the blade 36.

In order to increase the strength and durability of the trim panel, a sheet of glass fiber reinforcing material 52 is laid overtop the composite vinyl sheet 20 prior to the pouring of the urethane.

Subsequent to installation of a suitable number of clips 42 and the glass fiber reinforcing material, the lid, not shown, is placed over the lower mold 30 and liquid urethane of other suitable molding material is poured into the mold to lie atop the composite vinyl sheet 20 and the clip 42. Upon curing, the urethane adheres to the backside of the composite vinyl sheet 20 and adheres to the clips 42 so that the clips 42 are permanently affixed to and embedded in the trim panel 10. The molded trim panel 10 is lifted from the mold.

As seen in FIG. 2, the space occupied by the blade 36 of the mold defines a crevice 38 which defines and hides the joint between the different colored vinyl sheets 22 and 24.

By varying the dimension of the blade 36 of the mold 30, the width and depth of the crevice 38 can be varied to assure the concealment of the interface between the vinyl sheets 22 and 24.

Figure 4:
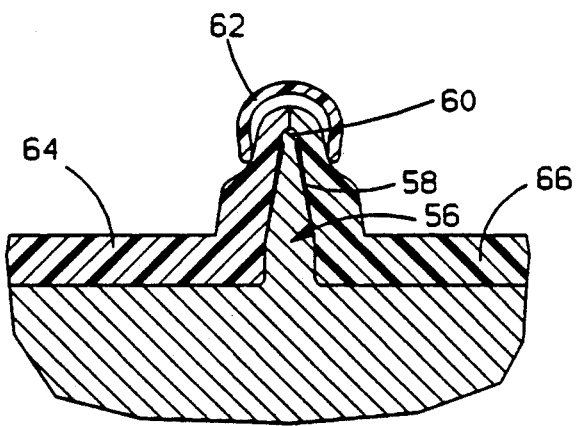
FIG. 4 is a fragmentary section view showing a second embodiment of the invention.

FIG. 4 is a section view taken through the mold showing that the shape and angle of the blade may be modified to minimize or otherwise modify the shape of the crevice between the different regions of the trim panel. In FIG. 4 the blade 56 has a tapered apex 58 and a terminal bulb 60. The mating clip 62 is C-shaped in cross-section and adapted to tightly snap fit overtop the bulb 60 of the blade 56. The vinyl sheets 64 and 66 have been dielectrically bonded together. Dielectric bonding is a desirable method for joining the vinyl sheets 64 and 66 together as the dielectric tool somewhat thins the vinyl material which in turn facilitates installation of the locating clips 62. The fastener 62 can be a plurality of individual clips, or a continuous extruded or roll-formed metal or plastic shape.

It will be understood that the foregoing description of the preferred embodiment is merely exemplary of this manufacturing process which can be employed to make a variety of motor vehicle interior trim components such as door panels, instrument panels, and other vehicle trim.

Thus it is seen that the invention provides a new and improved method for the manufacture of a vehicle trim panel having regions of different aesthetic characteristic.

The embodiments of the invention in which an exclusive property or privilege is claimed are defined as follows:

1. Method of manufacturing a vehicle trim panel having regions of differing aesthetic characteristic, comprising:

cutting to shape two pieces of flexible sheet cover material having the different aesthetic characteristics desired in the manufactured trim panel, bonding the two pieces together edge-to-edge to form a composite flexible sheet cover material, draping the composite flexible sheet cover material over a mold having a blade projecting from the mold surface, installing retainer means to attach the composite flexible sheet to the blade to hold the flexible sheet in place with the bond between the two sheets located on the blade;

draping a sheet of reinforcing material over the composite flexible sheet and retainer means;

closing the mold and pouring urethane against the composite sheet to encapsulate the retainers and adhere to the composite flexible sheet to thereby provide a flexible sheet covered trim panel with the bond between the two sheets concealed from view at the bottom of the crevice defined by the blade.

2. Method of manufacturing a vehicle trim panel having regions of differing aesthetic characteristics, comprising:

die-cutting to shape two pieces of sheet vinyl having the different aesthetic characteristics desired in the manufactured trim panel, dielectrically bonding the two pieces together edge-to-edge to form a composite vinyl sheet, draping the composite vinyl sheet over a mold having a blade projecting from the mold surface, installing retainer means to attach the composite vinyl sheet to the blade to hold the vinyl in place with the bond between the two sheets located on the blade;

draping a sheet of reinforcing material over the composite vinyl and retainer means;

closing the mold and pouring urethane against the composite sheet to encapsulate the retainers and adhere to the-composite vinyl sheet to thereby provide a vinyl covered trim panel with the bond between the two sheets concealed from view at the bottom of the crevice defined by the blade.

* * * * *